United States Patent  
Lazo et al.

(10) Patent No.: US 6,791,603 B2
(45) Date of Patent: Sep. 14, 2004

(54) EVENT DRIVEN VIDEO TRACKING SYSTEM

(75) Inventors: Philip A. Lazo, Ft. Lauderdale, FL (US); Rick F. Comoglio, Deerfield Beach, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 13 days.

(21) Appl. No.: 10/308,508

(22) Filed: Dec. 3, 2002

(65) Prior Publication Data

US 2004/0105006 A1 Jun. 3, 2004

(51) Int. Cl.[7] ............................. H04N 5/225; H04N 7/18
(52) U.S. Cl. ...................................... 348/169; 348/144
(58) Field of Search ................................ 348/169, 170, 348/143, 144, 148, 154, 159, 36, 207.99, 147, 161; 340/572.1, 933; 342/70

(56) References Cited

U.S. PATENT DOCUMENTS

| | | | | |
|---|---|---|---|---|
| 4,737,847 A | * | 4/1988 | Araki et al. ................. 348/161 |
| 4,952,911 A | * | 8/1990 | D'Ambrosia et al. ........ 340/557 |
| 5,317,394 A | * | 5/1994 | Hale et al. ............. 348/207.99 |
| 5,650,814 A | * | 7/1997 | Florent et al. ................ 348/39 |
| 5,666,157 A | | 9/1997 | Aviv ........................... 348/152 |
| 5,696,503 A | * | 12/1997 | Nasburg ....................... 340/933 |
| 5,708,423 A | | 1/1998 | Ghaffari et al. ......... 340/825.35 |
| 5,805,082 A | | 9/1998 | Hassett ........................ 340/928 |
| 5,949,335 A | * | 9/1999 | Maynard ................... 340/572.1 |
| 5,977,913 A | | 11/1999 | Christ .......................... 342/465 |
| 6,028,626 A | | 2/2000 | Aviv ........................... 348/152 |
| 6,154,790 A | | 11/2000 | Pruet et al. .................... 740/15 |
| 6,580,385 B1 | * | 6/2003 | Winner et al. ................. 342/70 |

* cited by examiner

*Primary Examiner*—Gims Philippe

(57) ABSTRACT

A system that tracks and electronically identifies assets from surveillance zone to surveillance zone within a controlled area is provided. A triggering event, which can be the output of an RFID reader, or other event, initiates video tracking of the asset that is associated with the RFID tag or other trigger. The video surveillance continues from zone to zone, as the image of the asset is handed-off from camera to camera. The image of the asset can be selectively displayed and recorded, along with the identity of the asset. The system is flexible and programmable for use in a plurality of different environments and surveillance zones, using a plurality of different triggering sensors and video cameras.

10 Claims, 2 Drawing Sheets

EVENT DRIVEN VIDEO TRACKING SYSTEM

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to video tracking of moving targets, and more particularly to video tracking initiated by an event trigger and where the target is tracked through a plurality of video zones.

2. Description of the Related Art

There are presently systems, such as disclosed in U.S. Pat. No. 5,708,423, for keeping track of the location of individuals or objects by attaching transponders to the individuals or objects and receiving identification signals transmitted by the transponders. A common technology to accomplish this is termed radio frequency identification (RFID). Typically, each transponder transmits a unique identification signal, which is used to identify the individual or object to which the transponder is attached. The identification signals generated by the transponders in such systems are, in general, to be received by an antenna and associated receiving circuitry. In some cases, the antenna is to be associated with a doorway or portal, which gives access to a room. There has also been some consideration given to determining the direction of an object being tracked with respect to a portal. A building in which articles are to be tracked may include a number of controlled zones, and zones that are not controlled. Articles may be permitted in certain zones, but not other zones. Alarms are often used to alert personnel of articles that are moved into or removed from specific controlled zones.

Controlled zones and associated portals may also be under video surveillance. Alarms are typically used to trigger video recording equipment to record various zones of interest. As disclosed in U.S. Pat. No. 6,028,626, the video surveillance system may be capable of determining speed, direction, and acceleration of objects within the video coverage.

Problems currently exist in present technology when certain incidents occur. For example, when a triggering event occurs, such as when an article with an attached RFID tag passes through an RFID monitored portal, video surveillance of the portal and/or associated zone may be initiated. When the triggering article moves into a different zone that may not include RFID antennas, the video surveillance in that zone will not be triggered and video surveillance of the article will be lost. Zone to zone video surveillance of specific assets is needed. In another example, an article may be authorized for removal from a controlled zone only by certain personnel. Without manual intervention, an alarm will be triggered if the article removed from the zone, even if the person removing the article has the proper authority to remove the article. Association of an asset with, not only a zone, but with a specific person is needed.

BRIEF SUMMARY OF THE INVENTION

The present invention provides a system that tracks assets from zone to zone within a controlled location. The tracking is initiated by a triggering event. The system may also electronically identify the assets, and selectively records and displays the asset and identity.

The event driven video tracking system and method includes a sensor for sensing a preselected event. The preselected event is located within a first zone. The video coverage of a first video surveillance camera defines the first zone. The first video surveillance camera is responsive to the sensor, which activates the first video surveillance camera in response to the preselected event. The first video surveillance camera monitors an image associated with the preselected event and tracks the image within the first zone. A second video surveillance camera has video coverage that defines a second zone. The first zone and the second zone have an overlapping portion. The second video surveillance camera acquires the image within the overlapping portion, and tracks the image within the second zone.

The system may have an asset database for associating the preselected event with preselected information relevant to the preselected event.

The preselected information can include the identity of an asset and the zones in which the asset is authorized to be located.

The preselected event can include reading an RFID tag.

The system can include a video recorder and/or a video display.

The system may have a plurality of the sensor and a plurality of video surveillance cameras defining a plurality of zones.

A predictive algorithm for predicting the speed and direction of the image can be used for tracking of the image.

In acquiring the image within the overlapping portion, translating coordinates of the image from the first zone to the second zone may be used.

Objectives, advantages, and applications of the present invention will be made apparent by the following detailed description of embodiments of the invention.

DETAILED DESCRIPTION OF THE INVENTION

Figure 1:
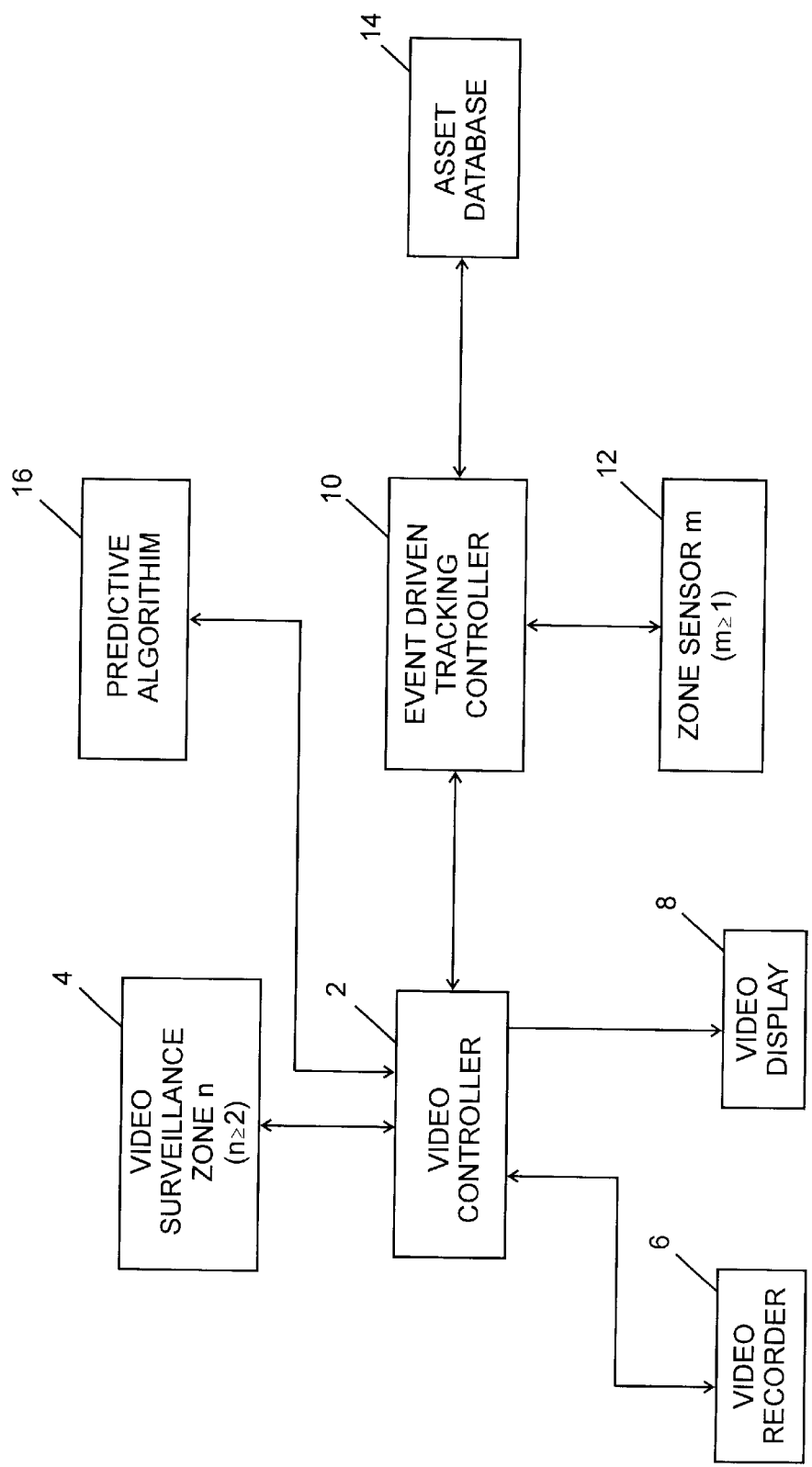
FIG. 1 is a block diagram of one embodiment of the present invention.

Referring to FIG. 1, video controller 2 controls each of "n" video surveillance zones 4, where "n" is greater than or equal ($\geq$) to 2 zones. Each video surveillance zone 4 can have a fixed focal length, zoom, pan and tilt, wide angle, or other camera, which is controlled by video controller 2. Video controller 2 also controls video recorder 6, which can be one or more analog or digital recorders, and video display 8, which can be one or more video displays. Event driven tracking controller 10, directs how the video controller 2 controls the video cameras in video surveillance zones 4 for tracking an asset. Event driven tracking controller 10 receives input from zone sensor 12. Zone sensor 12 uses one or more sensors "m", where "m"$\geq$1 sensor, to monitor selected areas called zones. Sensor "m" can be an RFID tag, infrared sensor, motion senor, optical sensor, audio sensor, or another sensor the output of which can be used to trigger event driven tracking controller 10. Event driven tracking controller 10 communicates with asset database 14, which includes a list of all the assets under system control, and can include the zones in which each asset is authorized to be within. If the assert leaves its associated zone, the video surveillance is triggered. Asset database 14 may include other rules as desired for asset control. An example of a rule is to trigger video tracking if a specific person enters a controlled area. An alternate rule would be asset number X is not permitted to leave controlled zone Y unless accompanied by one of assets A, B, or C, where A, B, and C are personnel authorized to remove asset X from zone Y. If the rule is violated, video tracking is triggered. Other associated actions can be initiated, such as alarms, automatic calls to authorized personnel, and other desired actions can be triggered as-well-as video tracking. Rule selection for the intended application is flexible, and can be implemented via programming.

Upon a triggering input to event driven tracking controller 10 from zone sensor 12, the event driven tracking controller 10 directs video controller 2 to begin tracking the asset in the appropriate video surveillance zone 4, and identifies the asset if the triggering event includes identification. The triggering event may be selected as desired, and may be an RFID read, which would include the asset's identification, or other sensor input that may not include identification, from a zone of interest. Once the video controller begins tracking the asset, the asset's identification, if known, can be stored and displayed, along with the video image, in video recorder 6 and video display 8, respectively. If multiple triggering events occur, a plurality of assets can be tracked, and identified.

Figure 2:
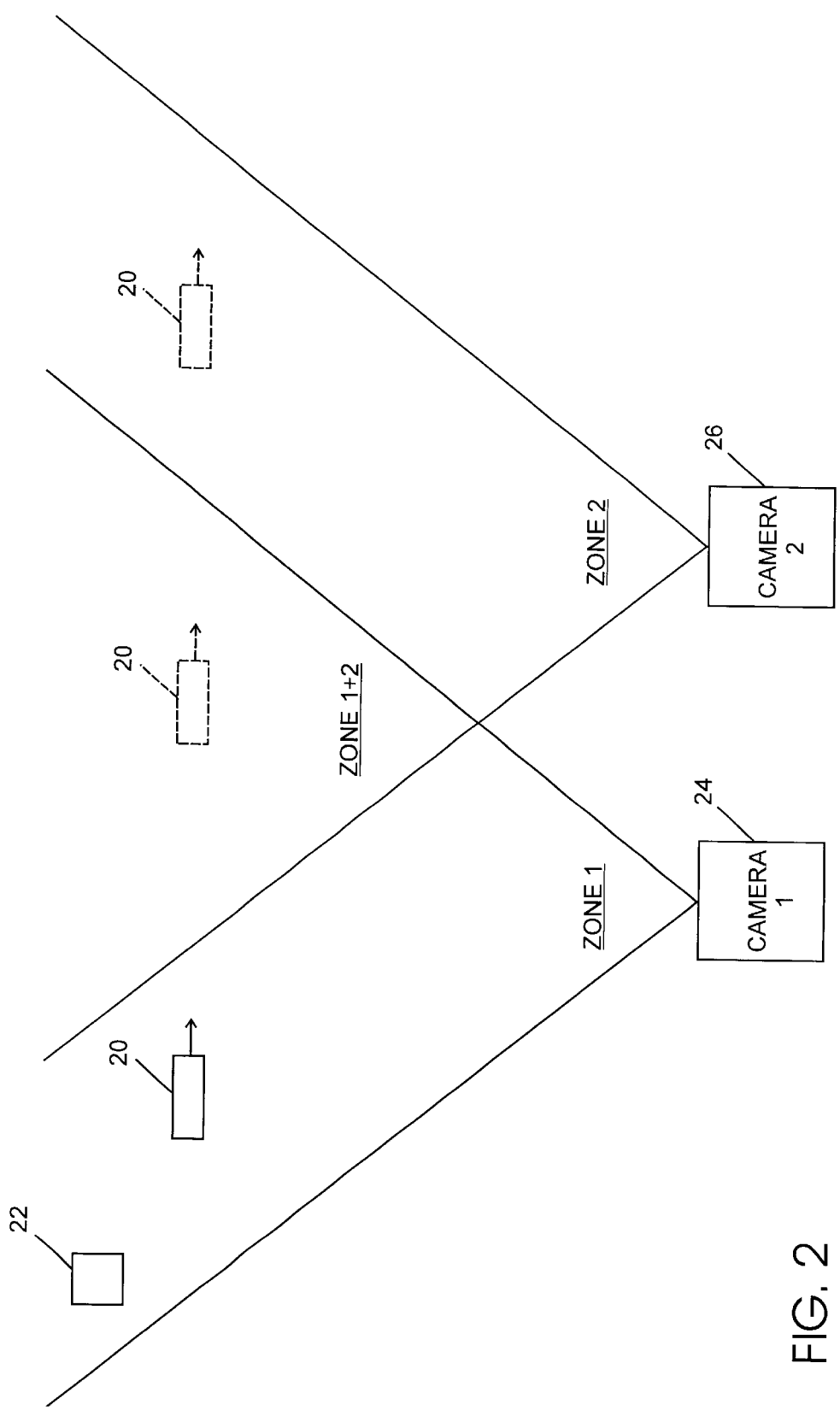
FIG. 2 is an illustrative block diagram of video zone handoff of assets in the present invention.

Referring to FIG. 2, one embodiment will be operationally described to illustrate the invention. Sensor "m" will be one or more RFID tags 20, and the input from zone sensor 12 to event driven tracking controller 10 will be the output of an RFID reader 22, which may be positioned near an entrance to video surveillance zone 1. Video surveillance zone 1 and video surveillance zone 2 are under surveillance by video camera 24 and video camera 26, respectively, which are controlled by video controller 2. Upon entry into zone 1, RFID reader 22 reads RFID tag 20. RFID reader 22 is in communication with event driven tracking controller 10, as shown by zone sensor 12 in FIG. 1, and communicates relevant information about the asset to which RFID tag 20 is connected, attached, or associated. Event driven tracking controller 10 is in communication with asset database 14 and will associate the information received from RFID tag 20 with relevant stored information.

As stated above, asset database 14 can include rules to be used to determine triggering events. Triggering events are events that occur with assets that are desired to be video tracked, and recorded and/or displayed. Assuming the information obtained from RFID tag 20 and communicated to event driven tracking controller 10 is a triggering event, event driven tracking controller 10 commands video controller 2 to begin tracking the triggering asset. At this point, the location of the asset will be known as it will be adjacent the RFID reader 22, and the tracking video camera 24 will easily acquire an image of the asset. The asset will now be under video surveillance and it will be identified according to information obtained from the RFID tag 20, and/or asset database 14. The asset can be a person with an RFID badge or an object with an RFID tag concealed within, connected to, attached to, or associated with in some manner. As the asset moves within zone 1, camera 24, under control of video controller 2, will track the asset, electronically and/or mechanically depending on the camera used. When RFID tag 20 moves into zone 1+2, video controller 2 will activate camera 26 and will pass along the location of the image associated with RFID tag 20 as known from camera 24. There are multiple ways in which the position of RFID tag 20 can be passed, such as establishing a coordinate system associated with each camera and translating the coordinates from the coordinate system of camera 24 to the coordinate system of camera 26. As RFID tag 20 moves into zone 2, camera 26 will continue surveillance, and camera 24 will lose surveillance. The number of zones and cameras can increase to virtually an unlimited number.

A combination of triggering sensors "m" can be used. For example, in certain zones only a motion detector may be implemented, the asset will be tracked but may not be identified. As the asset is tracked, it may move into a zone having an RFID sensor. Once the RFID reader 22 communicates with controller 10, the asset will be identified. Many other variations of sensors and zones are possible and easily accounted for with flexible programming of video controller 2 and event controller 10.

To assist in tracking the asset, video controller 2 may use predictive algorithm 16, as shown in FIG. 1, to determine useful tracking features of the asset. Useful tracking features included the image speed, direction, acceleration, and other relevant parameters. Optical flow computation, and other known techniques can be used in the predictive algorithm 16. The use of predictive algorithm 16 is particularly advantageous when the surveillance camera used is electronically or mechanically capable of pan and tilt, and zoom functions.

It is to be understood that variations and modifications of the present invention can be made without departing from the scope of the invention. The example provided in FIG. 2 is one embodiment and the specific implementation details can be altered. For example, a single controller or computer, or a plurality of controllers or computers may be implemented to perform the stated functions. It is also to be understood that the scope of the invention is not to be interpreted as limited to the specific embodiments disclosed herein, but only in accordance with the appended claims when read in light of the forgoing disclosure.

What is claimed is:

1. An event driven video tracking system, comprising:
    at least one zone sensor for sensing a preselected event, said preselected event having a location disposed within a first zone;
    a first video surveillance camera having video coverage within said first zone, said first video surveillance camera responsive to said zone sensor, said zone sensor activating said first video surveillance camera in response to said preselected event, wherein said first video surveillance camera monitors an image associated with said preselected event, said first video surveillance camera including means for tracking said image within said first zone; and,
    a second video surveillance camera having video coverage within a second zone, said first zone and said second zone having an overlapping portion, said second video surveillance camera having means for acquiring said image within said overlapping portion, and including means for tracking said image within said second zone.

2. The system of claim 1 further comprising asset database means for associating said preselected event with preselected information relevant to said preselected event.

3. The system of claim 2 wherein said preselected information includes the identity of an asset and the zones in which the asset is authorized to be located.

4. The system of claim 3 wherein said preselected event includes reading an RFID tag.

5. The system of claim 1 further comprising a video recorder.

6. The system of claim 1 further comprising a video display.

7. The system of claim 1 further comprising a plurality of said zone sensors, a plurality of video surveillance cameras defining a plurality of zones.

8. The system of claim 1 wherein said means for tracking said image within said first zone and said means for tracking said image within said second zone include a predictive algorithm for predicting the speed and direction of said image.

9. The system of claim 1 wherein said means for acquiring said image within said overlapping portion includes means for translating coordinates of said image from said first zone to said second zone.

10. A method for tracking a video image initiated by an event, comprising:

sensing the occurrence of a preselected event within a first zone within the video coverage of a first video surveillance camera;

activating said first video surveillance camera in response to said preselected event, monitoring an image associated with said preselected event, and tracking said image within said first zone; and acquiring said image with a second video surveillance camera within an overlapping portion of a second zone and said first zone, said second zone within the video coverage of said second video surveillance camera, and tracking said image within said second zone.

* * * * *